United States Patent
Deshmukh et al.

(10) Patent No.: US 12,418,792 B2
(45) Date of Patent: Sep. 16, 2025

(54) METHOD AND DEVICE FOR SELECTIVE USER PLANE SECURITY IN WIRELESS COMMUNICATION SYSTEM

(71) Applicant: SAMSUNG ELECTRONICS CO., LTD., Suwon-si (KR)

(72) Inventors: Aneesh Narendra Deshmukh, Bangalore (IN); Neha Sharma, Bangalore (IN); Shiva Souhith Gantha, Bangalore (IN); Anshuman Nigam, Bangalore (IN); Donghyun Je, Suwon-si (KR); Dongmyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 292 days.

(21) Appl. No.: 18/092,690

(22) Filed: Jan. 3, 2023

(65) Prior Publication Data

US 2023/0145440 A1    May 11, 2023

Related U.S. Application Data

(63) Continuation of application No. PCT/KR2023/000039, filed on Jan. 2, 2023.

(30) Foreign Application Priority Data

Jan. 3, 2022  (IN) .............................. 202241000161
Dec. 16, 2022 (IN) .............................. 202241000161

(51) Int. Cl.
*H04W 12/06* (2021.01)
*H04W 12/033* (2021.01)
(Continued)

(52) U.S. Cl.
CPC ................................ *H04W 12/033* (2021.01)

(58) Field of Classification Search
CPC ............. H04W 12/033; H04W 12/037; H04W 12/106; H04W 12/03
See application file for complete search history.

(56) References Cited

U.S. PATENT DOCUMENTS 10,505,725 B2   12/2019   Agiwal et al.
11,856,452 B2   12/2023   Kim et al.
(Continued)

FOREIGN PATENT DOCUMENTS

EP   3481140 A1   5/2019
EP   3 506 711    7/2019
(Continued)

OTHER PUBLICATIONS

Donghyun Je; Aneesh Deshmukh; Sunwoo Cho; Dongmyoung Kim; Neha Sharma; Jungsoo Jung; Juho Lee; Sunghyun Choi; Selective User Plane (UP) Security for Throughput Enhancement in Mobile Communication; 2002 IEEE Globecom Workshops; Year: Apr. 2022 | Conference Paper | Publisher: IEEE; pp. 1194-1199 (Year: 2022).*

(Continued)

*Primary Examiner* — Fatoumata Traore
*Assistant Examiner* — Courtney D Fields
(74) *Attorney, Agent, or Firm* — Nixon & Vanderhye, P.C.

(57) ABSTRACT

An example security processing method includes receiving data packets at a packet data convergence protocol (PDCP) layer from an upper layer and parsing header information of each of the data packets to determine a length of each of the plurality of headers within the corresponding header information and whether a security header is present or absent in the corresponding data packets. The method further includes identifying corresponding header information of the data packets in which the security header is present based on the
(Continued)

determination. The method further includes encrypting, based on the determined header lengths, only each of the plurality of headers of the identified corresponding header information in which the security header is present, and thereafter transmitting the one or more data packets to a lower layer after adding information regarding each of the encrypted headers along with their encryption length into a PDCP header.

16 Claims, 11 Drawing Sheets

(51) Int. Cl.
*H04W 12/08* (2021.01)
*H04L 12/841* (2013.01)
*H04L 29/06* (2006.01)

(56) References Cited

U.S. PATENT DOCUMENTS

| | | |
|---|---|---|
| 2015/0334033 A1 | 11/2015 | Wang et al. |
| 2016/0308776 A1 | 10/2016 | Ozturk et al. |
| 2018/0332469 A1 | 11/2018 | Lee et al. |
| 2019/0007211 A1 | 1/2019 | Chunduri et al. |
| 2019/0166576 A1 | 5/2019 | Kim et al. |
| 2019/0373672 A1 | 12/2019 | Kim |
| 2020/0037165 A1 * | 1/2020 | Kunz .................. H04W 12/106 |
| 2020/0059817 A1 * | 2/2020 | Baek ................. H04W 28/0273 |

FOREIGN PATENT DOCUMENTS

| | | |
|---|---|---|
| KR | 10-2019-0138202 | 12/2019 |
| KR | 10-2312670 | 10/2021 |
| WO | 2020/130673 | 6/2020 |
| WO | WO-2020249324 A1 * | 12/2020 ........... H04L 1/1642 |
| WO | WO-2023220147 A1 * | 11/2023 ............ H04W 76/12 |

OTHER PUBLICATIONS

Office Action dated Dec. 22, 2023 in Indian Patent Application No. 202241000161 and English-language translation.
3GPP TS 38.323 V16.6.0, 3GPP, TSG RAN; NR; PDCP specification (Release 16), dated Dec. 23, 2021 (40 pages).
International Search Report dated Apr. 20, 2023 in PCT Application No. PCT/KR2023/000039.
Written Opinion dated Apr. 20, 2023 in PCT Application No. PCT/KR2023/000039.
Extended Search Report dated Feb. 11, 2025 in EP Application No. 23735155.6.
Rajavelsamy R et al, "Towards Performance Improvement of User Plane Traffic in Wireless System; Security Aspects"; 2020 IEEE 17th Annual Consumer Communications Networking Conference (CCNC), IEEE, Jan. 10, 2020 (Jan. 10, 2020), pp. 1-2.

* cited by examiner

METHOD AND DEVICE FOR SELECTIVE USER PLANE SECURITY IN WIRELESS COMMUNICATION SYSTEM

CROSS-REFERENCE TO RELATED APPLICATIONS

This application is a continuation of International Application No. PCT/KR2023/000039 designating the United States, filed on Jan. 2, 2023, in the Korean Intellectual Property Receiving Office and claiming priority to Indian Provisional Patent Application No. 202241000161, filed on Jan. 3, 2022, in the Indian Patent Office and to Indian Complete Patent Application No. 202241000161, filed on Dec. 16, 2022, in the Indian Patent Office, the disclosures of all of which are incorporated by reference herein in their entireties.

BACKGROUND

Field

The disclosure relates to the field of wireless communication. For example, the disclosure relates to a system and method for selective user plane security for the 6G data plane.

Description of Related Art

In recent years, several broadband wireless technologies have been developed for providing better applications and services to meet growing requirements of broadband subscribers. A second generation wireless communication system has been developed to provide voice services while ensuring mobility of users. A third generation wireless communication system supports not only voice services but also data service. In recent years, fourth generation (4G) and fifth generation (5G) wireless communication systems have been developed to provide high-speed data service.

Mobile phone usage has grown exponentially over the years since the advent of 4G and 5G technology. The increased use of multiple mobile apps, various applications, and services has resulted in a massive load in the user experience and the network protocols. With the increased usage of available services and applications, a single user will tend to have multiple streams of IP flow and applications supported over a single Protocol Data Unit (PDU) session.

An important aspect of wireless communication is to provide ciphering and integrity protectection to data being transferred over the wireless medium. Encryption ciphering is basically classified as block cipher or stream cipher. Most encryption algorithms implemented under Radio Access Network (RAN) protocol are block ciphering algorithms in which messages are converted into fixed-size blocks before converting them into an encrypted message using a private key known and configured at a RAN. Such software operations for larger size packets take a lot of processing cycles in terms of CPU utilization. With increasing nature of security threats and techniques being discovered to hack to any security or perform any kind of cryptanalysis, it is necessary that security of data over a wireless network cannot be compromised at any cost even if takes a large number of CPU cycles. Current CPU utilization analysis indicates that further increases in throughput result in bottlenecks. With ever increasing demand to increase the throughput and to meet the throughput in real time, there is a need to address the CPU cycles required for any functionality within the data plane processing part. A good enough amount of saving for security will also lead to reduced energy consumption and power savings in certain aspects leading to greener impacts of future technologies. However, security is something which cannot be compromised.

Securing data over a wireless connection is of utmost importance to avoid any man-in-the-middle attack or any spurious User Equipment (UE) trying to connect to the network (NW) or detect a fake gNB to guarantee secure connection and services to the UE. Data exchanged over a wireless network can never be compromised as it can have far reaching effects on privacy issues. With many applications and information being exchanged like banking, social media profiles, chats, video streams and others, there are many security policies in place at each layer in the end-to-end protocol stack. In the Open Systems Interconnect (OSI) model, there are security mechanisms embedded in each of the layers either at Application Layer, Transport Layer, Internet Protocol Layer, Data Link Layer or the Physical Layer. Hence, duplicate security already exists across multiple protocol layers at various hierarchy levels across the end-to-end protocol. For example, Application Data is encrypted using TLS (Transport Layer Security), on top of which the Packet Data Convergence Protocol (PDCP) layer applies its user plane security from a RAN perspective. The New Radio (NR) PDCP layer supports integrity protection of data. It generates a MAC-I for the entire payload including protocol headers. Further, the PDCP Payload and the MAC-I generated is ciphered or encrypted to protect the data received for that UE. In 5G communication, multiple levels of security exist across end-to-end Protocol stacks at various protocol layers. During wireless communication between the user device and gNB, an F1 interface connects a gNB-Control Unit (CU) to gNB-Distributed Units (DUs). This interface is applicable to the CU-DU Split gNB architecture. The control plane of the F1 (F1-C) allows signaling between the CU and DU, while the user plane of the F1 (F1-U) allows the transfer of application data. Duplicated security in the F1-U is added via IP security. This results in duplication of the encrypted data i.e., doubly secured. Thus, the duplicate functionality of security adds extra overhead in terms of encrypting the data that is already encrypted.

An example scenario depicting integrity and ciphering for a Data Radio Bearer in a 5G communication system is illustrated in FIG. 1 of the drawings, in accordance with an existing state of the art. As can be seen in FIG. 1, a MAC-I is generated on the complete payload of a data packet including the Packet Data Convergence Protocol Header (PDCP-H) and Service Data Adaption Protocol Header (SDAP-H). The MAC-I is generated on the complete Payload of the data packet when the integrity and ciphering are supported by the 5G communication system for the Data Radio Bearer (DRB). Also, it can be seen in FIG. 1 that the MAC-I is placed at an end of the payload i.e., the last 4 bytes of the PDCP Protocol data unit (PDU). Thereafter, the entire payload of the data packets is ciphered, except the PDCP-H and SDAP-H.

Due to this duplication of encrypted data, higher processing and CPU complexity are required, which in turn may impact the overall system throughput. Additionally, higher cost and higher power is required as security accelerators may be involved for performing security-related data processing.

Therefore, a need exists for optimizing or improving the packet data processing associated with the application in order to reduce any overhead in terms of complexity related to security. Also, a need exists for a method and system that can avoid encryption of already encrypted data to make the data processing faster.

SUMMARY

This summary introduces a selection of concepts in a simplified format that is further described in the detailed description. This summary is not intended to identify key or essential inventive concepts of the disclosure, nor is it intended for determining the scope of the disclosure.

The disclosure provides a method and device for processing selective user plane security effectively in wireless communication system.

The disclosure provides a method and device for selective user plane security for 6G data plane.

An embodiment of the disclosure may provide a security processing method performed at a transmitter in a communication network. The method includes receiving one or more data packets at a Packet Data Convergence Protocol (PDCP) layer from an upper layer. Each data packet includes header information and application data. The header information includes a plurality of headers. The method further includes parsing the header information of each of the one or more data packets and then, based on the parsing of the header information, determining a length of each of the plurality of headers within the corresponding header information and whether a security header is present or absent in the one or more corresponding data packets. The method further includes identifying corresponding header information of the one or more packets in which the security header is present based on the determination. The method further includes encrypting, based on the determined header lengths, only each of the plurality of headers of the identified corresponding header information in which the security header is present, and thereafter transmitting the one or more data packets to a lower layer after adding information regarding each of the encrypted headers along with their encryption length into a PDCP header.

An embodiment of the disclosure may also provide a security processing method performed at a receiver in a communication network. The method includes receiving one or more data packets from a transmitter through a lower layer. Each of the data packets includes a PDCP header and header information including an IP header. The PDCP header includes information related to an encrypted portion of the header information and an encryption length of the encrypted portion. The method further includes determining, based on a Data Radio Bearer (DRB) configuration of each of the one or more data packets, a security mode that is enabled for a corresponding data packet of the one or more data packets. The method further includes determining whether selective encryption is enabled in the corresponding data packet of the one or more data packets based on the determined security mode and parsing of the information related to the encrypted portion of the header information and the encryption length of the encrypted portion from the PDCP header. After the determination of whether the selective encryption is enabled, the method further includes decrypting the IP header of data packets for which it is determined that the selective encryption is enabled.

An embodiment of the disclosure may also provide a wireless communication system that includes a transmission device. The transmission device includes a transceiver and at least one processor. The at least one processor is configured to control the transceiver to receive one or more data packets at a Packet Data Convergence Protocol (PDCP) layer from an upper layer. Each of the data packets includes header information and application data. The header information includes a plurality of headers. The at least one processor is further configured to parse the header information of each of the one or more data packets and based on the parsing of the header information determine a length of each of the plurality of headers within the corresponding header information and whether a security header is present or absent in the one or more corresponding data packets. The at least one processor is further configured to identify corresponding header information of the one or more packets in which the security header is present based on the determination The at least one processor is further configured to encrypt, based on the determined header lengths, only each of the plurality of headers of the identified corresponding header information in which the security header is present, and thereafter control the transceiver to transmit the one or more data packets to a lower layer after adding information regarding each of the encrypted headers along with their encryption length into a PDCP header.

An embodiment of the disclosure may also provide a wireless communication system that includes a reception (receiver) device. The reception device includes a transceiver and at least one processor. The at least one processor is configured to control the transceiver to receive one or more data packets from a transmission device through a lower layer. Each of the data packets includes a PDCP header and header information including an IP header. The PDCP header includes information related to an encrypted portion of the header information and an encryption length of the encrypted portion. The at least one processor is further configured to determine, based on a DRB configuration of each of the one or more data packets, a security mode that is enabled for a corresponding data packet of the one or more data packets. The at least one processor is further configured to determine whether selective encryption is enabled in the corresponding data packets of the one or more data packets based on the determined security mode and parsing of the information related to the encrypted portion of the header information and the encryption length of the encrypted portion from the PDCP header. After the determination of whether the selective encryption is enabled, the at least one processor is further configured to decrypt the IP header of data packets for which it is determined that the selective encryption is enabled.

According to an embodiment, a non-transitory computer readable storage medium may include one or more programs, the one or more programs comprising instructions configured to, when executed by at least one processor of an transmission device, cause the transmission device to receive one or more data packets at a PDCP layer from an upper layer. Each data packet includes header information and application data. The header information includes a plurality of headers. The instructions may be configured to cause the transmission device to parse the header information of each of the one or more data packets and then, based on the parsing of the header information. The instructions may be configured to cause the transmission device to determine a length of each of the plurality of headers within the corresponding header information and whether a security header is present or absent in the one or more corresponding data packets. The instructions may be configured to cause the transmission device to identify corresponding header information of the one or more packets in which the security header is present based on the determination. The instructions may be configured to cause the transmission device to encrypt, based on the determined header lengths, only each of the plurality of headers of the identified corresponding header information in which the security header is present, and thereafter transmitting the one or more data packets to a lower layer after adding information regarding each of the encrypted headers along with their encryption length into a PDCP header.

According to an embodiment, a non-transitory computer readable storage medium may include one or more programs, the one or more programs comprising instructions configured to, when executed by at least one processor of a reception (receiver) device, cause the transmission device to receive one or more data packets from a transmitter through a lower layer. Each of the data packets includes a PDCP header and header information including an IP header. The PDCP header includes information related to an encrypted portion of the header information and an encryption length of the encrypted portion. The instructions may be configured to cause the reception device to determine, based on a DRB configuration of each of the one or more data packets, a security mode that is enabled for a corresponding data packet of the one or more data packets. The instructions may be configured to cause the reception device to determine whether selective encryption is enabled in the corresponding data packet of the one or more data packets based on the determined security mode and parsing of the information related to the encrypted portion of the header information and the encryption length of the encrypted portion from the PDCP header. After the determination of whether the selective encryption is enabled, the instructions may be configured to cause the reception device to decrypt the IP header of data packets for which it is determined that the selective encryption is enabled.

To further clarify the advantages and features of the disclosure, a more particular description of the disclosure will be rendered by reference to specific non-limiting example embodiments thereof, which is illustrated in the appended drawing. It is appreciated that these drawings depict example embodiments of the disclosure and are therefore not to be considered as limiting. The disclosure will be described and explained with additional specificity and detail with the accompanying drawings.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
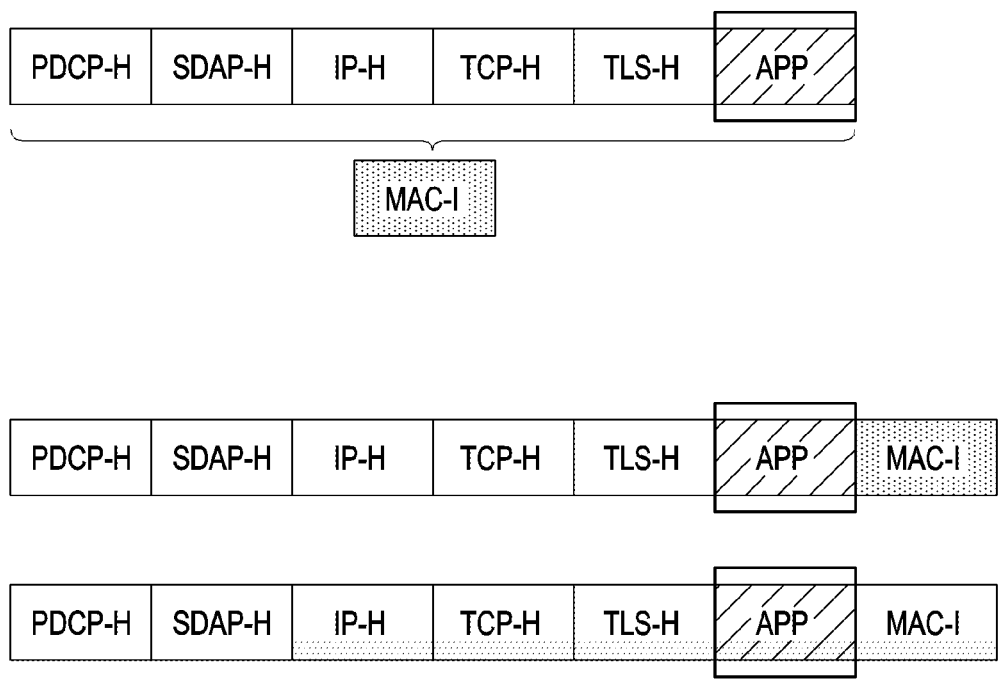
FIG. 1 is a diagram illustrating an example scenario depicting integrity and ciphering for a Data Radio Bearer in a 5G communication system, in accordance with existing art.

It should be understood at the outset that although illustrative implementations of example embodiments of the disclosure are illustrated below, the embodiments may be implemented using any number of techniques, whether currently known or in existence. The present disclosure should in no way be limited to the illustrative implementations, drawings, and techniques illustrated below, including the example design and implementation illustrated and described herein, but may be modified within the scope of the appended claims along with their full scope of equivalents.

The term "some" or "one or more" as used herein is defined as "one," "more than one," or "all." Accordingly, the terms "one," "more than one," or "all" would all fall under the definition of "some" or "one or more." The term "an embodiment," "some embodiments," or "in one or more embodiments" may refer to one embodiment or to several embodiments or to all embodiments. Accordingly, the term "some embodiments" is defined as meaning "one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents.

More specifically, any terms used herein such as but not limited to "includes," "comprises," "has," "consists," "have" and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language "must comprise" or "need to include."

Whether or not a certain feature or element is limited to being used only once, either way, it may still be referred to as "one or more features," "one or more elements," "at least one feature" or "at least one element." Furthermore, the use of the terms "one or more" or "at least one" feature or element does not preclude there being none of that feature or element unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skill in the art.

According to one or more embodiments of the present disclosure, an identification of the duplicated security in the PDCP Layer can be performed by performing a simple packet classification. When PDCP security is applied on already encrypted application data, redundant security has been applied. User plane integrity protection and ciphering are mandatory to be supported in 5G NR, but optional to use. Both integrity and ciphering are known to require heavy processing. With the kind of full throughput supported at the 5G User Plane, the processing required for integrity and ciphering is too high even in current commercial systems at the network. In view of this, the disclosure describes an application aware PDCP security method to reduce the processing overhead of duplicated security. The application aware PDCP security method helps in avoiding duplicate security by not applying encryption on already encrypted data.

The disclosure further describes a plurality of options for PDCP Header structure and location of Message Authentication Code-Integrity (MAC-I) for enhanced data plane processing for the selective security method.

The Core Control Plane of the network may configure a specific bearer to handle a selective security profile and accordingly update both the RAN and the UPF. The UPF can send per data packet information to the PDCP layer to decide whether the application data contains any encrypted data. A PDCP layer at the RAN may also parse per data packet information to choose what security profile to be selected.

Example embodiments of the disclosure will be described below in detail with reference to the accompanying drawings.

Figure 2A:
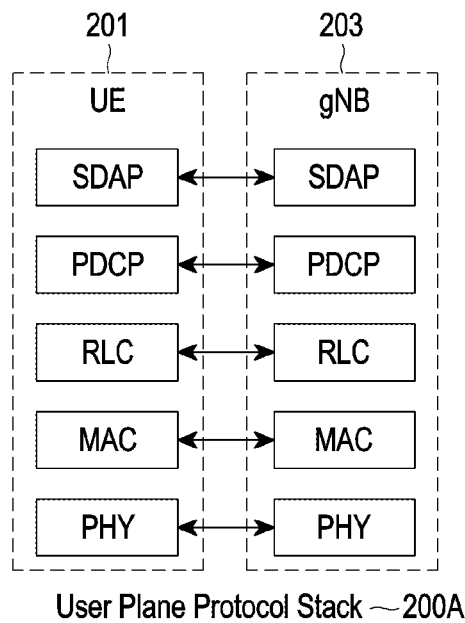
FIGS. 2A and 2B are block diagrams illustrating a RAN protocol stack between a User Equipment (UE) and an NG Radio Access Network (NG-RAN i.e., gNB) based on the 3rd generation partnership project (3GPP) radio access network, respectively, in accordance with existing art.
Figure 2B:
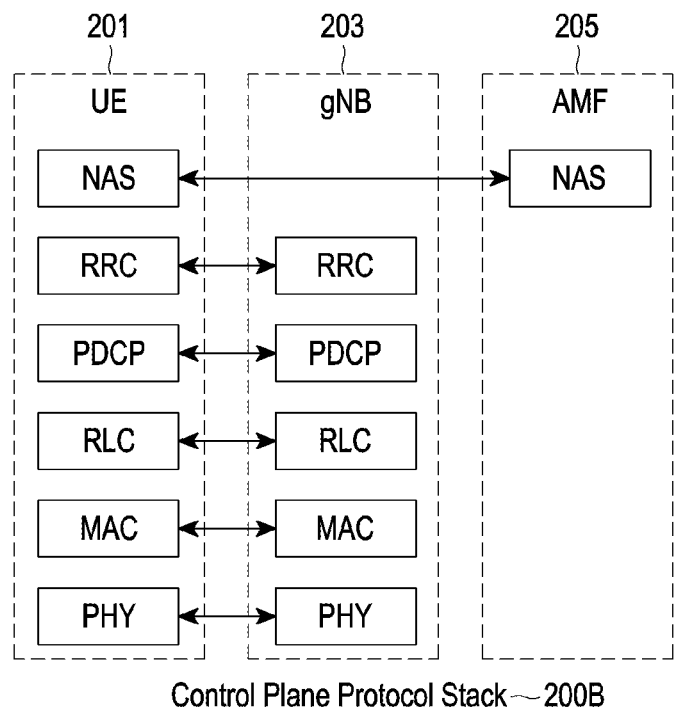

FIGS. 2A and 2B are diagrams illustrating a RAN protocol stack between a User Equipment (UE) and an NG Radio Access Network (NG-RAN i.e., gNB) based on the 3rd generation partnership project (3GPP) radio access network, respectively, in accordance with existing art. FIGS. 2A and 2B depict a UE 201, a gNB 203, and an AMF 205. The gNB 203 is connected to the AMF 205 by means of the NG control-plane part. One gNB 203 can be connected to multiple AMFs for load sharing and redundancy. The gNB 203 is connected to the UE 201 via a communication interface (Uu interface). For the UE 201 to communicate with the network (AMF 205 or UPF), the gNB 203 handles all the uplink as well as downlink transmissions. All data flows, user data, and RRC signaling are also handled by the gNB 203. Each of the UE 201 and the gNB 203 includes at least one processor (e.g., including processing circuitry) for handling the uplink and downlink communications using the communication interface. Further, at least one processor (e.g., including processing circuitry) may control and manage the data flows required for the uplink and downlink communications with the network (AMF 205).

As shown in FIGS. 2A and 2B, there are two protocol stacks i.e., a user plane protocol stack 200A and a control plane protocol stack 200B including a plurality of layers for wireless communication between the UE 201 and the gNB 203 or between the UE 201 and the network 205 via the gNB 203. The user plane refers, for example, to a path used for transmitting data generated in an application layer, e.g., audio data, video data, internet packet data, and the like. The control plane refers, for example, to a path used for transmitting control messages used for managing a call between the UE 201 and the gNB 203. The layer 2 of 5G NR as shown in FIG. 2A includes a plurality of layers for downlink and uplink communication. The plurality of layer includes a physical layer (PHY), a Service Data Adaptation Protocol (SDAP) layer, a Packet Data Convergence Protocol (PDCP) layer, a Radio Link Control (RLC) layer, and a Medium Access Control (MAC) layer. The physical layer provides transport channels to the MAC layer. The MAC layer provides logical channels to the RLC layer. The RLC layer provides RLC channels to the PDCP layer. The PDCP layer provides radio bearers to the SDAP layer. The SDAP layer further provides the radio bearers to the 5GC QoS flows.

The main services and functions of the PDCP layer for the user plane include sequence numbering, header compression and decompression, transfer of user data, reordering and duplicate detection (if in-order delivery to layers above PDCP is required), retransmission of PDCP SDUs, PDCP re-establishment and data recovery for RLC AM, and duplication of PDCP PDUs, etc. The reordering is taken care of in the PDCP layer as per the Digital Radio Bearer (DRB) in the PDCP. Further, one of the main services and functions of the PDCP sublayer for the control plane includes a sequence numbering of the packet data to be transmitted.

Figure 3:
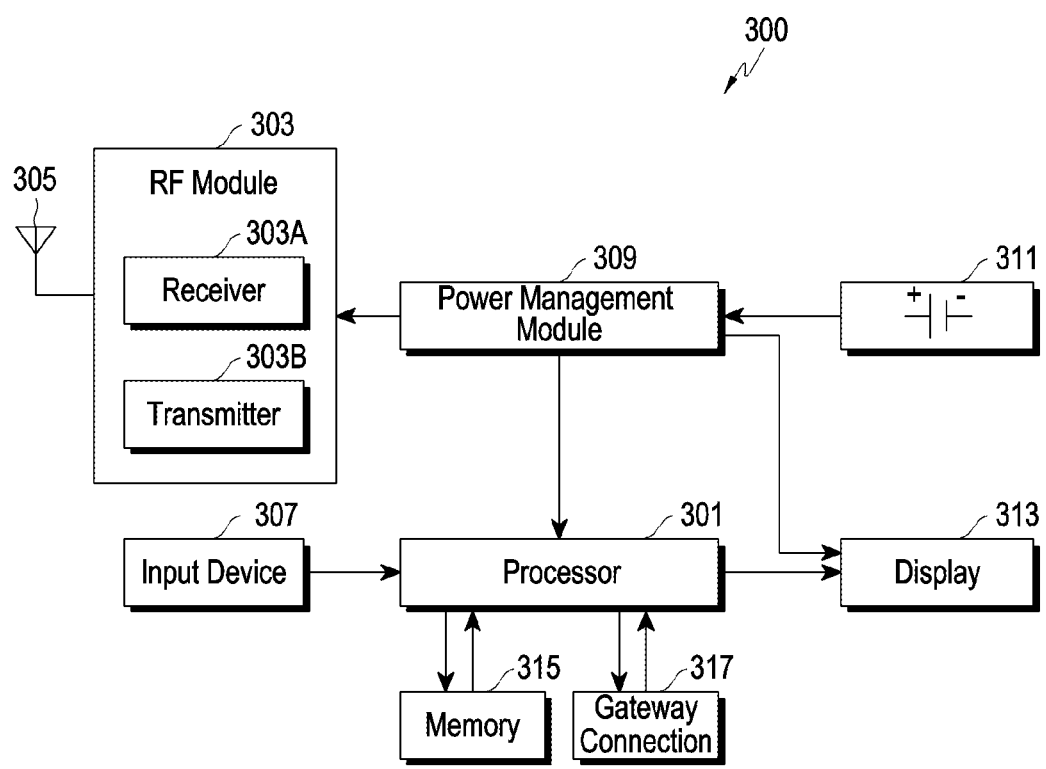
FIG. 3 is a block diagram of a communication system including a transmitter and a receiver, in accordance with existing art.

Referring now to FIG. 3, a block diagram of a communication system including a transmitter and a receiver is shown, in accordance with existing art. The communication system as shown in FIG. 3 may be implemented in the UE 201 and/or the gNB 203 of FIG. 2A and may be adapted to perform the method illustrated in FIGS. 4, 5, and 9. The communication system as shown in FIG. 3 may be implanted as a transmission device and/or a reception (receiver) device, in accordance with an embodiments.

As shown in FIG. 3, the communication system may include a processor 301 and an RF module (transceiver 303). The processor 301 is coupled and connected to the transceiver 303 and is configured to control the entire operation of the transceiver 303. According to an example implementation, the communication system may further include an antenna 305 connected to the RF module (transceiver 303), an input device 307 (e.g., including input circuitry), a power management module 309 (e.g., including power management circuitry), a battery 311, a display 313, a memory 315, and a gateway connection 317.

Specifically, when the communication system of FIG. 3 is implemented in the UE 201, the communication system comprises a receiver 303A and a transmitter 303B included in the transceiver 303. The communication system of FIG. 3 as the UE 201 includes the processor 301, where the processor 301 is connected to the transceiver (303: receiver 303A and transmitter 303B).

Also, the communication system of FIG. 3 when implemented in the gNB 203 includes a receiver 303A and a transmitter 303B. The receiver 303A and the transmitter 303B are included in the transceiver 303, where the processor 301 is connected to the transceiver (303: receiver 303A and transmitter 303B).

The processor 301 can be a single processing unit or several processing units, all of which could include multiple computing units. The processor 301 is configured to fetch and execute computer-readable instructions and data stored in the memory 315. As an example embodiment, the processor 301 may be part of a standard computing system. The processor 301 may be one or more general processors, digital signal processors, application-specific integrated circuits, field-programmable gate arrays, servers, networks, digital circuits, analog circuits, combinations thereof, or other now known or later developed devices for analyzing and processing data. The processor 101 may include any processing hardware, software, or combination of hardware and software utilized by a computing device that carries out the computer-readable program instructions by performing arithmetical, logical, and/or input/output operations.

The input device 307 (e.g., including input circuitry) is configured to allow a user to interact with any of the components of communication system 300. The input device 307 may also deliver instructions or data entered by the user through input units (e.g., a sensor, a keyboard, a communication module (e.g., a Bluetooth (BT) module, Wireless Fidelity (Wi-Fi) module) or a touch screen) to the processor 301 via a bus. For example, the input device 307 may provide data for a user touch input through the touch screen to the processor 301.

The display 313 corresponds to displays such as, but not limited to, a liquid crystal display (LCD), an organic light-emitting diode (OLED), a flat panel display, a solid-state display, a projector, a printer, or other now known or later developed display device for outputting determined or output information. The display 313 may act as an interface for the user to see the functioning of the processor 301, or specifically as an interface with the software stored in the memory 315.

The memory 315 may include, but is not limited to, computer-readable storage media such as various types of volatile and non-volatile storage media, including but not limited to, random access memory, read-only memory, programmable read-only memory, electrically programmable read-only memory, electrically erasable read-only memory, flash memory, magnetic tape or disk, optical media and the like. In one example, memory 315 includes a cache or random-access memory for the processor 301. The memory 315 may be an external storage device or database for storing data. The memory 315 is operable to store instructions executable by the processor 301. The functions, acts, or tasks illustrated in the figures or described may, for example, be performed by the programmed processor 301 for executing the instructions stored in the memory 315.

The gateway connection 317 corresponds to a communication interface that may perform communication between the UE 201 and the gNB 203 or the AMF 205. For example, the communication interface may be connected to a network through wired or wireless communication and may perform communication between the UE 201 and the gNB 203 or the AMF 205. The wireless communication may include at least one of Wi-Fi, BT, Near Field Communication (NFC), GPS, and/or cellular communication. The wired communication may include at least one of a Universal Serial Bus (USB), High-Definition Multimedia Interface (HDMI), a Recommended Standard (RS), and the like.

Figure 4:
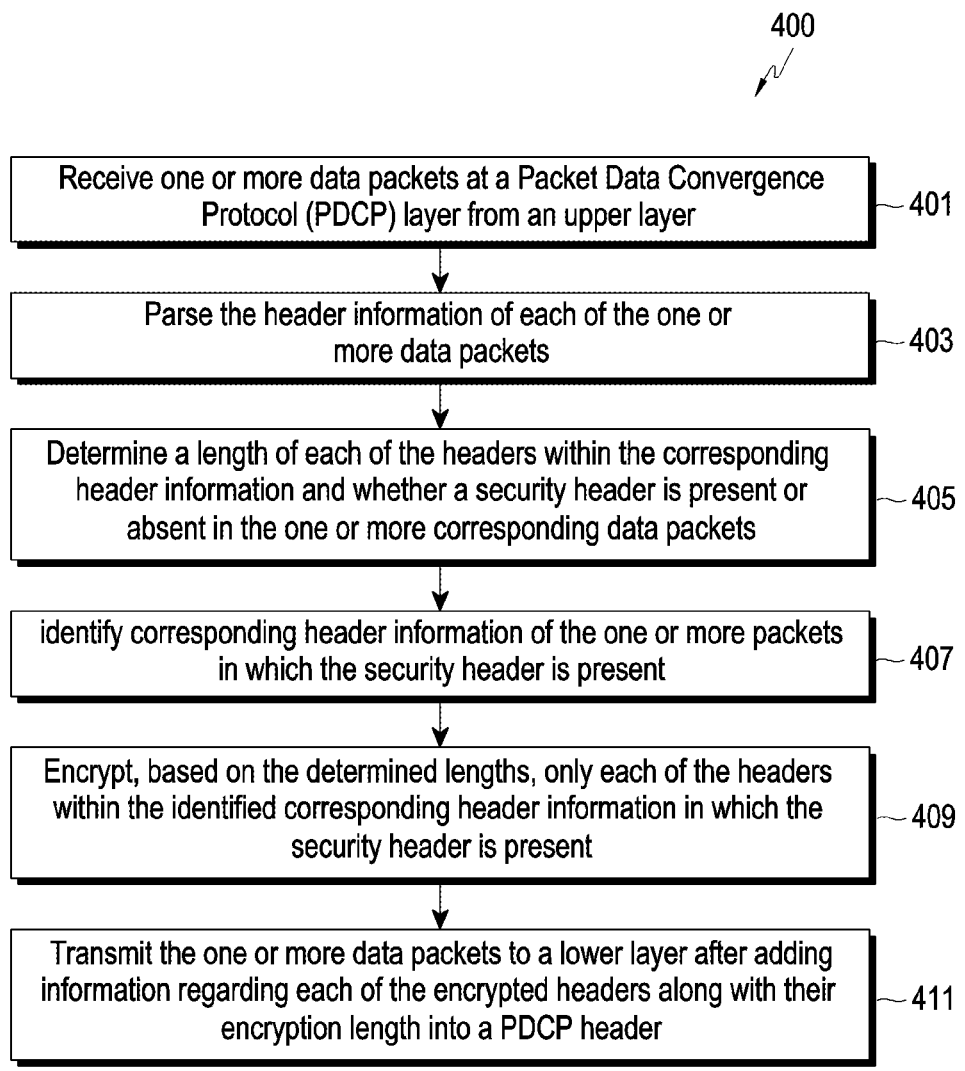
FIG. 4 is a flow chart of an example security processing method at a transmitter, in accordance with an embodiment.

Now, a flow chart of method steps for security processing at the transmitter end will be described with reference to FIG. 4 of the Drawings. FIG. 4 is a flow chart of a security processing method (400) at the transmission device, in accordance with an embodiment.

The method 400 includes (at step 401) receiving one or more data packets at the PDCP layer from an upper layer. As an example, the processor 301 receives the data packets at the PDCP layer from an upper layer. Each of the data packets that are received at the PDCP layer may include header information and application data. The header information may include a plurality of headers.

According to an embodiment of the disclosure, the plurality of headers may include an IP header, a security header, a transport control protocol (TCP) header, and/or an SDAP header. Further, the security header may include transport layer security (TLS) header information. The flow of the method 400 now proceeds to step 403.

At step 403, the method 400 includes parsing the header information of each of the one or more data packets that are received at the PDCP layer. As an example, the processor 301 parses the information that is included in the IP header of each of the received data packets. According to an embodiment of the present disclosure, the processor 301 utilizes the information that is parsed from the IP header to calculate the IP 5-tuple. The flow of the method 400 now proceeds to step 405.

At step 405, the method 400 includes determining, by the processor 301 based on the parsing of the header information, a length of each of the plurality of headers within the corresponding header information and whether a security header is present or absent in the one or more corresponding data packets. The flow of the method 400 now proceeds to step 407.

At step 407, the method 400 includes identifying, by the processor 301, the corresponding header information of the one or more packets in which the security header is present based a result of the determination performed at step 405.

According to an embodiment of the present disclosure, the processor 301 may also calculate a total length of the headers within the corresponding header information based on a sum of the determined lengths of the headers. The flow of the method 400 now proceeds to step 409.

At step 409, the method 400 includes encrypting, by the processor 301 based on the determined header lengths, only each of the headers of the identified corresponding header information in which the security header is present. Further, in accordance with an embodiment of the present disclosure, the method 400 may include encrypting each of the headers and the application data associated with the header information in which the security header is absent and IP flow is unencrypted. As an example, the processor 301 determines whether IP flow of the packets, in which the security header is absent, is encrypted or not. When it is determined that the IP flow of the packets, in which the security header is absent, is not encrypted, the processor 301 encrypts each of the headers and the application data associated with the header information. The flow of the method 400 now proceeds to step 411.

At step 411, the method 400 includes transmitting, by the processor using the transreciever 303, the one or more data packets to a lower layer after adding information regarding each of the encrypted headers along with their encryption length into a PDCP header. In particular, the processor 301 performs a set of operations before transmitting the one or more data packets to the lower layer. The set of operations includes adding, into the PDCP header, information regarding each of the encrypted headers along with their encryption length. The set of operations further includes adding the PDCP header to each of the one or more data packets after the addition of the information regarding each of the encrypted headers and then transmitting, to the lower layer, the one or more data packets with the PDCP header including additional security information.

Figure 5:
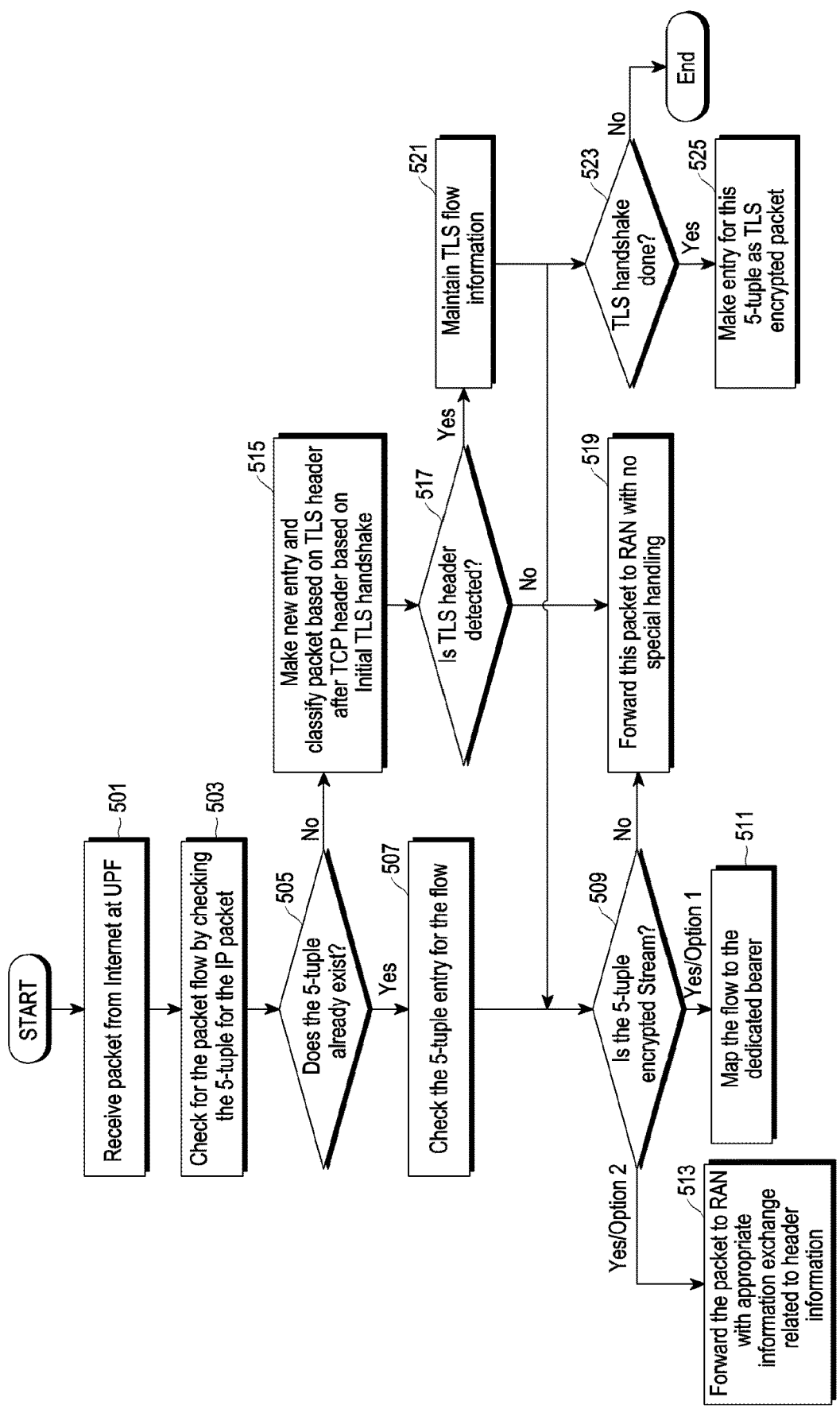
FIG. 5 is a flow diagram illustrating an example packet classification process for security processing at a transmitter, in accordance with an embodiment.

Referring now to FIG. 5, a flow diagram 500 illustrates an example packet classification process for the security processing at the transmitter, in accordance with an embodiment.

In step 501, the processor 301 receives the data packets from the internet at a User Plane Function (UPF).

In step 503, the processor 301 checks for the packet flow by checking for the 5-tuple for the IP packet in the data packets received at the UPF. In particular, the processor 301 determines a flow of the received data packets by checking for the IP 5-tuple.

In step 505, the processor 301 determines whether the IP 5-tuple exists in the received data packets. If a result of the determination in step 505 is "Yes", then in step 507, the processor 301 checks for the 5-tuple entry for the packet flow, and the packet classification process flow proceeds to step 509. As a non-limiting example, the IP 5-tuple includes a source port, a source address, a destination port, a destination address, and a type of IP protocol.

Further, in step 509, the processor 301 determines whether the 5-tuple entry is a part of the encrypted bitstream. If a result of the determination in step 509 is "Yes", then as a first option, the processor 301 may map the packet flow to the dedicated bearer (step 511). Particularly, when it is determined that the 5-tuple entry is part of the encrypted bitstream then the processor 301 maps, to a security mode, a flow of a corresponding data packet among the received data packets with a corresponding dedicated bearer among Data Radio Bearers (DRBs) using an RRC configuration. Here, the corresponding dedicated bearers indicate different types of security modes that are enabled for the corresponding data packets. The processor 301 may then transmit the data packets with the mapped flow to the lower layer of the network.

Further, as a second option, the processor 301 may forward the received data packet to the gNB 203 (RAN) with appropriate information exchange related to the header information (step 513).

Further, if the result of the determination in step 505 is "No", then the packet classification process flow proceeds to step 515. In step 515, the processor 301 makes a new entry and classifies the data packets based on the TLS header after the TCP header that is based on the initial TLS handshake. The packet classification process flow proceeds to step 517.

In step 517, the processor 301 determines whether the TLS header is detected within the received data packets. If a result of the determination in step 517 is "No", then the packet classification process flow proceeds to step 519. In step 519, the processor 301 forwards the data packets in which there is no TLS header detected to the gNB 203 (RAN) without any special handling. However, if a result of the determination in step 517 is "yes" then the packet classification process flow proceeds to step 521. In step 521, the processor 301 maintains the TLS flow information of the received data packets.

Additionally, in step 523, the processor 301 performs a determination to check whether a TLS handshake is performed or not. If in step 523, it is determined that the TLS handshake is performed, then the processor 301 makes an entry for the 5-tuple as a TLS encrypted packet (step 525). Further, if in step 523, it is determined that the TLS handshake is not performed, then the processor 301 takes no further action on the received data packets and the packet classification process comes to an end. Furthermore, the outcome of all the received packets in the step 501 may be at least one of steps 513, 511, and 509. The check in the step 523 may involve a lot of intermediate steps which are required to be maintained as per what kind of TLS header is received in the step 521. All packets, even during these intermediate steps may continue to be processed and hence need to be processed as per one of the steps 513, 511, and 509. Once the decision in the step 523 is "yes", the flow is marked encrypted in the step 525, following which the next packets of this flow will move in order of operations of the step 505, step 507, step 509 and step 511.

According to an embodiment of the present disclosure, the processor 301 when implemented in the transmission device, may determine whether IP packets among the received data packets are already classified as an encrypted flow based on the IP 5-tuple associated with the IP header. Accordingly, the processor 301 may only transmit those IP packets that are classified as the encrypted flow, to the lower layer without applying any encryption (ciphering) at the PDCP layer.

Figure 6:
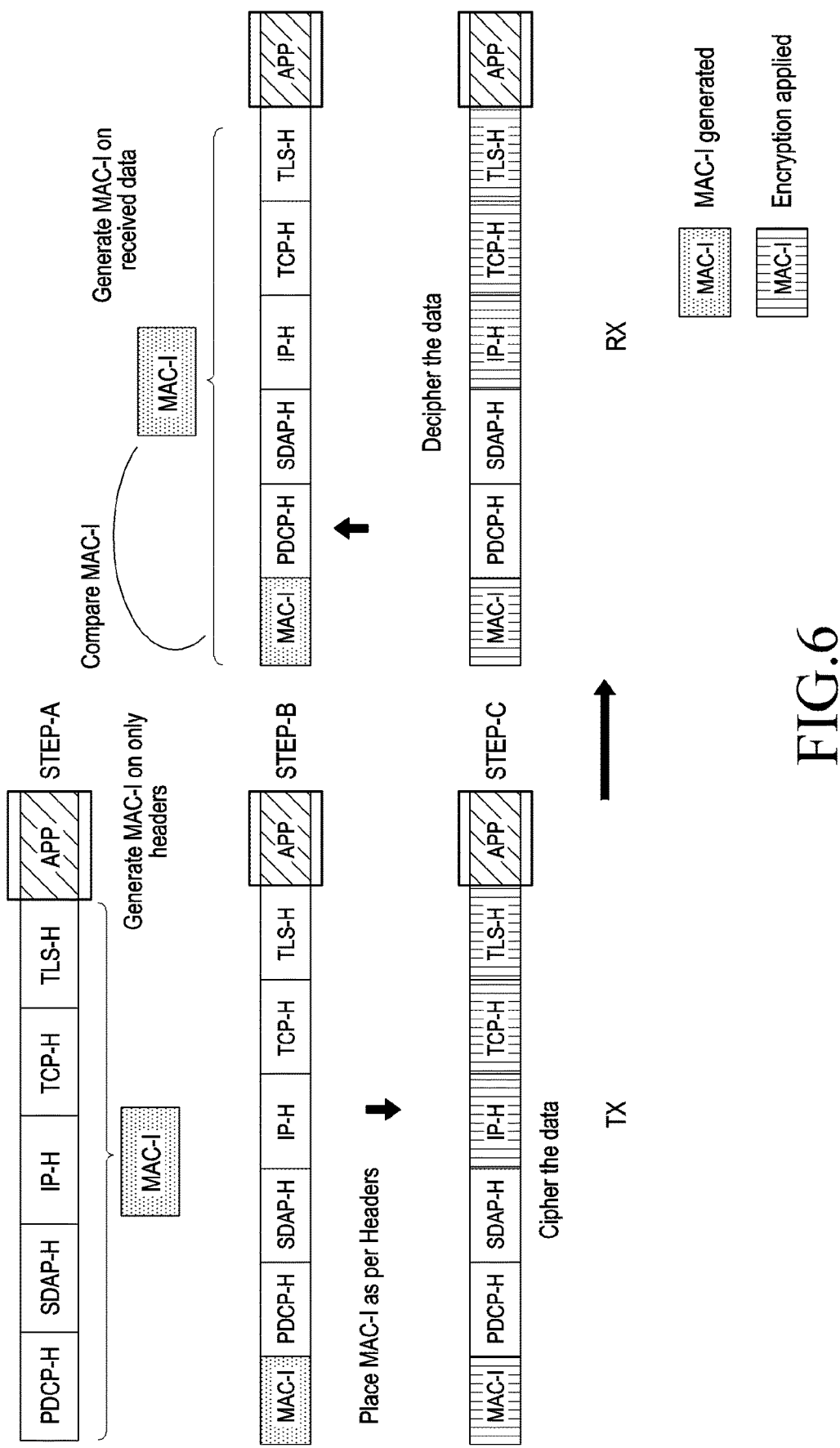
FIG. 6 illustrates an example procedure of security processing like integrity and ciphering only for the non-encrypted headers that are present in an application payload, in accordance with an embodiment.

FIG. 6 illustrates an example procedure of security processing like integrity and ciphering only for the non-encrypted headers that are present in an application payload, in accordance with various embodiments. The procedure shown on the left hand side of FIG. 6 is performed at the transmitter end (side) and the procedure shown on the right hand side of FIG. 6 is performed at the receiver end (side).

According to an embodiment of the present disclosure, the processor 301 determines whether the application data of the received data packets including the security header is encrypted or non-encrypted by parsing the the corresponding header information. Thereafter, the processor 301 performs an integrity protection process on at least one of the application data and the corresponding header information of the received data packets when it is determined that at least one of the application data of the received data packets is non-encrypted. The integrity protection process includes the addition of the MAC-I field at a location that is present before the application data field within the packet payload of each of the received data packets. Here, an optimal location corresponds to a location on a specific portion of the header information within the payload of the received data packets. For example, as shown in FIG. 6, the MAC-I is generated only on the header part of the payload (shown in STEP-A). Application data is not considered while generating the MAC-I if the application data is already encrypted.

As another non-limiting example, MAC-I is placed at the start of the payload i.e., the first 4 bytes of the PDCP PDU (shown in STEP-B). Further, the processor 301 encrypts (ciphers) the added MAC-I field and thereafter adds information regarding the location of the MAC-I field and the encryption of the MAC-I field into the PDCP header of each of the received data packets. During this encryption process (STEP-C), application data is not encrypted. Only MAC-I and the non-encrypted headers part of the payload are encrypted. Due to this, the processing required to apply security is reduced, thus saving on certain CPU complexity, and hence resulting in an increase in the throughput.

The processor 301 is further configured to control the transmitter to transmit, to the lower layer, the received data packets to which the information regarding the location of the MAC-I field and the encryption of the MAC-I field is added into the PDCP header.

As per the right side of FIG. 6, the receiver receives the data packets to which the information regarding the location of the MAC-I field and the encryption of the MAC-I field is added into the PDCP header from the transmitter through the lower layer. Thereafter, the receiver decrypts the IP header of data packets to extract the header information included in the IP header and generates a MAC-I for each of the data packets received from the transmitter based on the extracted header information as a result of the decryption of the IP header. The receiver then compares the integrity of the generated MAC-I with the integrity of the MAC-I field included in the data packets received from the transmitter.

Further, when there is a match between the integrity of the generated MAC-I and the integrity of the MAC-I field included in the data packets received from the transmitter, then the receiver determines that the data packets received from the transmitter are valid and accordingly performs the decryption. In particular, the receiver determines the validity of the data packets from the transmitter based on a result of the comparison that indicates whether there is a match between the integrity of the generated MAC-I and the integrity of the MAC-I field included in the data packets from the transmitter.

Figure 7:
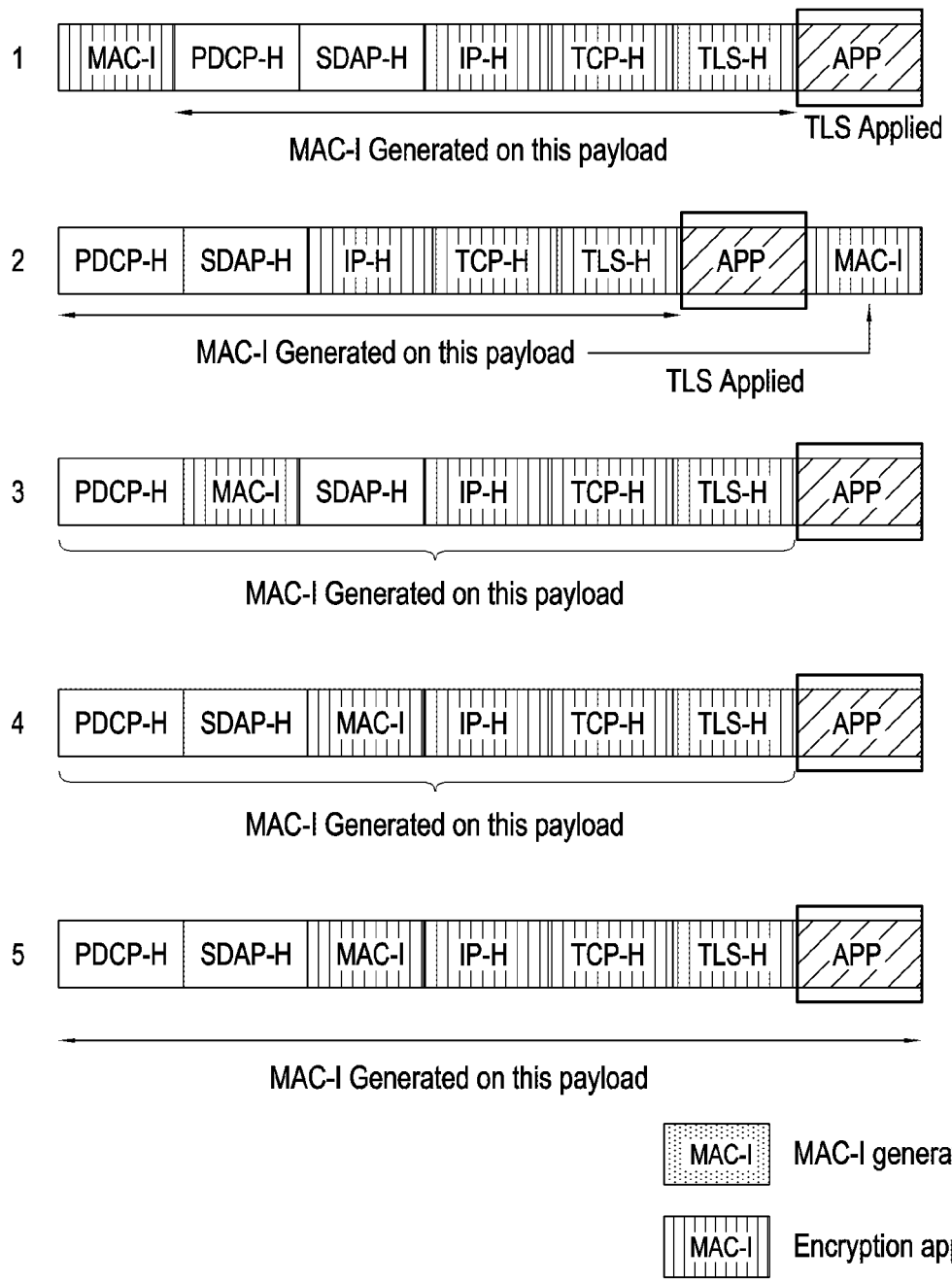
FIG. 7 illustrates an example scenario depicting multiple positions in the PDCP PDU for the placement of MAC-I, in accordance with an embodiment.

FIG. 7 illustrates an example scenario depicting multiple possible positions in the PDCP PDU for the placement of MAC-I, in accordance with an embodiment. If application data is determined as already encrypted, multiple possible options are possible as shown in 1, 2, 3, 4, and 5 in FIG. 7 in order to have a location of MAC-I within the payload. For example, a MAC-I need not be placed at the end of the data packet. This would impact performance as accessing the far away position in the buffer is costlier for a memory operation. Optionally, only encryption may be performed partially while complete integrity can be provided for the entire packet.

According to an embodiment of the present disclosure, when security is dynamically supported, the processor 301 may also add additional information in the PDCP header for exchanging information related to the mode of security, encryption length, and a location of the MAC-I as an optional field in the PDCP header. Optionally, the encryption may be performed first and then followed by the integrity protection process.

According to some embodiments of the present disclosure, the MAC-I masking needs to be known to the transmitter and receiver in order to compute the MAC-I correctly, when the MAC-I location is also a part of the input on which the digital key is to be generated. Accordingly, the processor 301 may also mask a location of the MAC-I field with a unique mask if the MAC-I field is present at a location within the packet payload of the received data packets.

Figure 8:
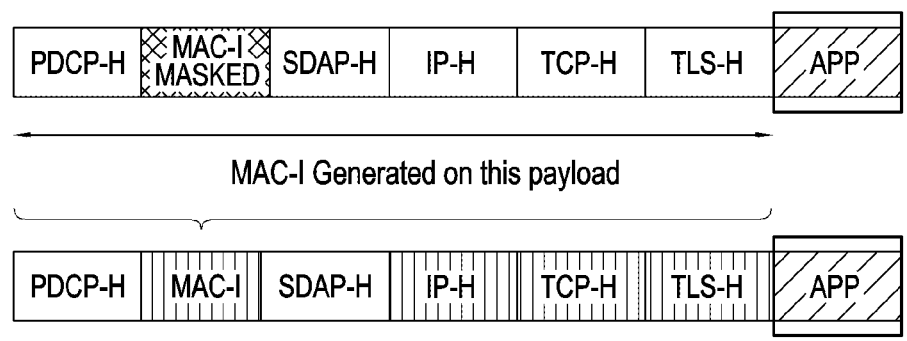
FIG. 8 illustrates an example of a data payload depicting a masked location of the MAC-I field, in accordance with an embodiment.

FIG. 8 illustrates an example of a data payload depicting a masked location of the MAC-I field, in accordance with an embodiment.

Figure 9:
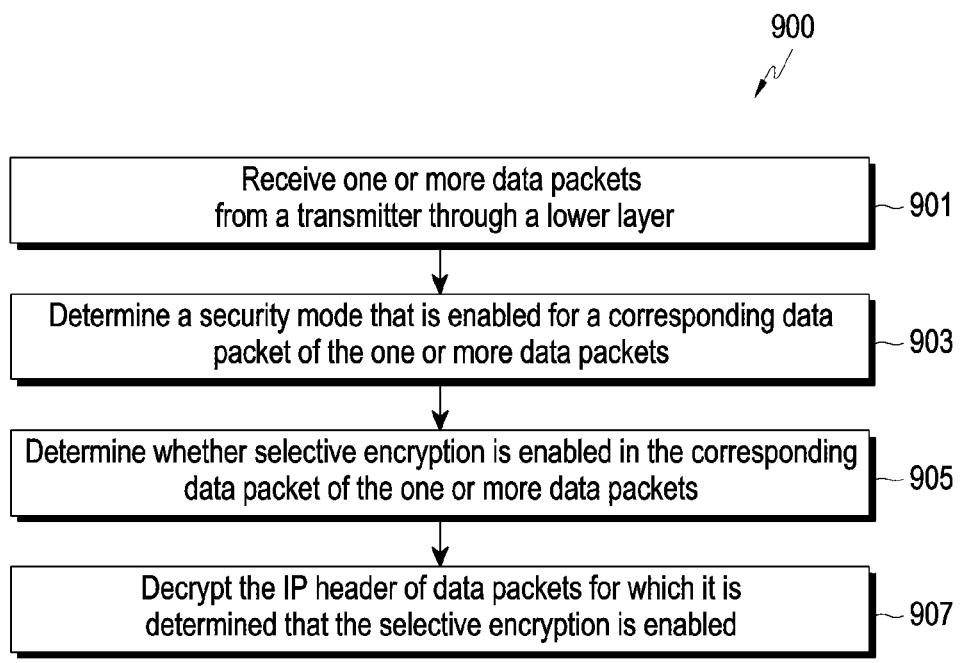
FIG. 9 is a flow chart of an example security processing method at a reception (receiver) device, in accordance with an embodiment.

Now, a flow chart of method steps for security processing at the receiver end will be described with reference to FIG. 9 of the Drawings. FIG. 9 is a flow chart of an example security processing method (900) at the reception (receiver) device, in accordance with an embodiment.

The method 900 includes at step 901 receiving one or more data packets from the transmission device (transmitter) through a lower layer. As an example, the processor 301, when implemented in the reception (receiver) device, receives one or more data packets from the transmission device (transmitter) through the lower layer. Each of the data packets that are received by the reception device includes a PDCP header and header information including an IP header. The PDCP header includes information related to an encrypted portion of the header information and an encryption length of the encrypted portion. Further, each of the received data packets includes the MAC-I field, and the PDCP header may also include a location of the MAC-I field with respect to the location of the header information. The flow of the method 900 now proceeds to step 903.

At step 903, the method 900 includes determining a security mode that is enabled for corresponding data packets that are received from the transmission device. The determination of the security mode is based on a DRB configuration of data packets received from the transmission device. The DRB configuration includes a corresponding DRB ID for the corresponding data packets that are received from the transmission device. In particular, gNB establishes at least one Data Radio Bearer (DRB) with the PDU session and additional DRB(s) for QoS flow(s) of that PDU session are subsequently configured for each UE. As an example, based on the corresponding DRB ID for the corresponding data packets received from the transmission device, the processor 301 implemented in the reception device may determine the security mode that is enabled for the corresponding data packets (i.e., for example, whether the received data packets are integrity protected or not). As a non-limiting example, the processor 301 may determine 4 bytes of the PDCP PDU is MAC-I and may accordingly read the information included in the PDCP header. The flow of the method 900 now proceeds to step 905.

At step 905, the method 900 includes determining, based on the determined security mode, whether selective encryption is enabled in the corresponding data packets that are received from the transmission device and, parsing the information related to the encrypted portion of the header information and the encryption length of the encrypted portion from the PDCP header. The flow of the method 900 then proceeds to step 907.

At step 907, the method 900 includes decrypting the IP header of data packets for which it is determined that the selective encryption is enabled.

Figure 10A:
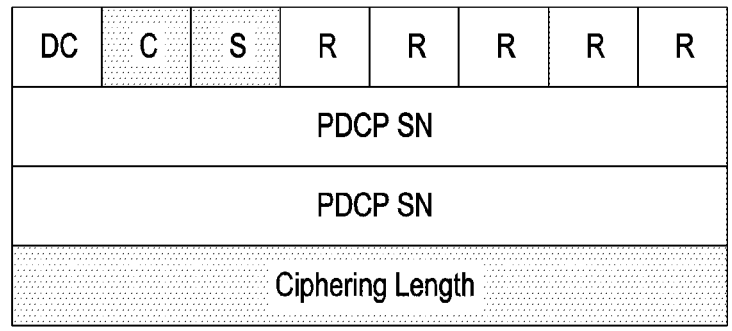
FIG. 10A is a diagram illustrating a first example modification of the PDCP Header PDU format for exchanging information related to ciphering length, in accordance with an embodiment.

Now an example description of the modifications in the PDCP Header format will be described with reference to FIGS. 10A, 10B, and 10C. FIG. 10A is a diagram illustrating a first example modification of the PDCP Header PDU format for exchanging information related to ciphering length, in accordance with an embodiment. FIG. 10A depicts a PDCP Header PDU format 1000 A that includes a D/C (Data/Control Bit), a PDCP SN, and other data including a plurality of 'R' bits. The plurality of 'R' bits includes a 'C' bit and an 'S' bit. The 'R' bits (e.g., 'C') may indicate whether the ciphering is enabled or not. If the 'R' bits ('C') indicate that the ciphering is enabled, then a 3-byte header can be followed by an optional 1-byte header extension to indicate the ciphering length of the PDU. Further, the data/control bit denotes the control bit for the PDU and the PDCP SN denotes a PDCP sequence number. Further, the processor 301 may use one of the 'R' (e.g., 'S') bits to indicate whether the SDAP header exists or not. This may be used as additional information for determining the length of the selective security feature. Thus, in accordance with an embodiment of the present disclosure, the processor 301 may compute, if the SDAP header length exists, the integrity length of the data packets as a sum of the ciphering length, SDAP Header Length, and the PDCP header length.

In accordance with an embodiment of the present disclosure, if selective ciphering is of no fixed length, then the transmission device may inform the ciphering length to the reception device.

Figure 10B:
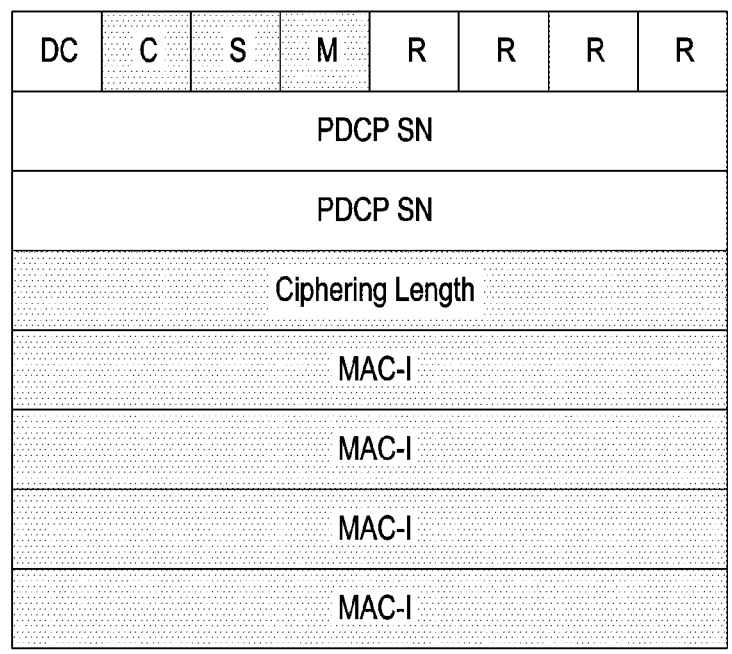
FIG. 10B is a diagram illustrating a second example modification in the PDCP Header PDU format for exchanging information related to ciphering length and location of the MAC-I as optional fields, in accordance with an embodiment.

FIG. 10B is a diagram illustrating a second example modification (1000 B) in the PDCP Header PDU format for exchanging information related to ciphering length and location of the MAC-I as optional fields, in accordance with an embodiment.

In accordance with an embodiment of the present disclosure, the PDCP control PDUs may at least contain MAC-I information without ciphering to provide some validity to the Control PDUs. Hence, the PDCP Header PDU format of FIG. 10B is different from FIG. 10A in terms of the 'R' bits (e.g., 'M') that indicates the existence of the MAC-I field. Due to the presence of the 'R' bit ('M'), a failure detection for security for control PDUs can be communicated to the upper layers of the network appropriately. The MAC-I field is a part of the PDCP header and the PDCP header is not integrity protected. The MAC-I is calculated for the following information described with reference to below 'R' bits 'SP' from the SDAP header onwards, but the MAC-I can be ciphered.

Figure 10C:
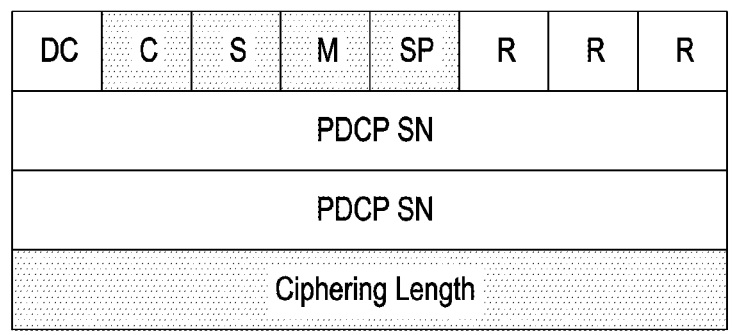
FIG. 10C is a diagram illustrating a third example modification in the PDCP Header PDU format for exchanging information related to a mode of security and the ciphering length, in accordance with an embodiment. Further, skilled artisans will appreciate that elements in the drawings are illustrated for simplicity and may not have necessarily been drawn to scale. For example, the flow charts illustrate the method in terms of steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those having the benefit of the description herein.

FIG. 10C is a diagram illustrating a third example modification (1000 C) in the PDCP Header PDU format for exchanging information related to a mode of security and the ciphering length, in accordance with an embodiment. The structure of the PDCP Header PDU format 1000 C is different from the PDCP Header PDU formats 1000 A and 1000 B in terms of the 'R' bits (e.g., 'SP') that indicate which security profile is enabled. In particular, if a security profile is to be dynamically changed at the transmission device based on some indication for the packet classification, then one of the "R" bits may be configured as 'SP' i.e., Security Profile to indicate which scheme (either full security or partial security is applied for a current data packet). When the 'R' bit 'SP' indicates a value of 1 that means full security is applied for the current data packet and when the R' bit 'SP' indicates a value of 0 that means partial security is applied under the case for a security profile for a DRB where the security is applied per packet, differentiating the security need, based on application data type and security applied within the data packet.

Referring now to the technical abilities and effectiveness of the security processing methods disclosed herein provides the various technical advantages over the conventional and existing state of the art such as it helps in correctly identifying the packet data type and hence the redundant procedure of re-ciphering already protected application data can be avoided. It also helps in saving a large amount of CPU cycles and hence helps in enhancing the throughput by allowing more packets to be processed within the same limited CPU resource. The security processing methods disclosed herein avoid duplicate security of already encrypted data by applying selective integrity and selective security on the data packets. The application of the selective integrity and selective security disclosed herein helps in reducing overheads in terms of complexity related to the security i.e., integrity protection and encryption. Since the processing load depends on the length of the portion of the data packets on which integrity and encryption are applied, therefore the selective integrity and selective security disclosed herein may also help in reducing the processing load.

The security processing methods disclosed herein may support high throughput for next generation applications that may require higher throughput. Moreover, use of the security processing methods disclosed herein can save on CPU processing cycles and hence make the communication system more energy efficient. The application data can remain in a buffer that is not accessed by the processor at all.

An application area for the security processing methods disclosed herein is the security in a UE modem. The security in a UE modem is typically implemented using hardware accelerators. For PDCP Security, if the application data is already encrypted, there is no need for security accelerators to access the actual application data. For the operations like header creation, integrity is operated on initial packet headers only. The security accelerator can be designed to leverage the fact that header information always lies in a fixed length of the data packet. Therefore, the security processing methods disclosed herein may provide an advantage while designing a memory for such header creations.

In a hardware configuration, the method according to the embodiments of the present disclosure may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present disclosure may be implemented in the form of modules, procedures, functions, etc. performing the above-described functions or operations.

The embodiment described above are provided by way of illustration only and should not be construed to limit the scope of the disclosure. Various modifications and changes may be made to the principles described herein without following the example embodiment and applications illustrated and described herein, and without departing from the spirit and scope of the disclosure.

Those skilled in the art will appreciate that the operations described herein in the present disclosure may be carried out in other specific ways than those set forth herein without departing from essential characteristics of the disclosure. The above-described embodiments are therefore to be construed in all aspects as illustrative and not restrictive. The scope of the disclosure should be determined by the appended claims, not by the above description, and all changes coming within the meaning of the appended claims are intended to be embraced therein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A security processing method performed by a transmitter in a communication network, the method comprising:

receiving, at a packet data convergence protocol (PDCP) layer from an upper layer, one or more data packets, each of the one or more data packets including header information and application data, wherein the header information includes a plurality of headers;
parsing the header information of each of the one or more data packets;
determining, based on the parsing of the header information, a length of each of the plurality of headers within the corresponding header information and whether a security header is present or absent in the one or more corresponding data packets;
identifying, based on the determination, corresponding header information of the one or more data packets in which the security header is present;
identifying, based on the parsing of the header information, whether internet protocol (IP) packets among the received one or more data packets are already classified as an encrypted flow;
encrypting, based on the determined header lengths, each of the plurality of headers of the identified corresponding header information in which the security header is present; and
transmitting the one or more data packets to a lower layer after adding information regarding each of the encrypted headers along with their encryption length into a PDCP header,
wherein the plurality of headers includes an IP header, a security header, a transport control protocol (TCP) header, and a service data adaption protocol (SDAP) header,
wherein the security header includes a transport layer security (TLS) header information, and
wherein the transmitter transmits, to the lower layer, the IP packets without applying encryption at the PDCP layer in a case that the IP packets are already classified as the encrypted flow.

2. The method as claimed in claim 1, further comprising:
calculating, based on a sum of the determined lengths of the plurality of headers, a total length of the plurality of headers within the corresponding header information; and
encrypting the plurality of headers and the application data associated with the header information in which the security header is absent and an internet protocol (IP) flow is unencrypted.

3. The method as claimed in claim 1,
wherein whether the IP packets among the received one or more data packets are already classified as the encrypted flow is identified based on an IP 5-tuple associated with the IP header.

4. The method as claimed in claim 1,
wherein the parsing of the header information includes parsing of information included in the IP header,
wherein the information included in the IP header is used to calculate anthe IP 5-tuple, wherein the IP 5-tuple includes a source port, a source address, a destination port, a destination address, and a type of IP protocol; and
wherein the method further comprises determining a flow of the one or more data packets based on the IP 5-tuple.

5. The method as claimed in claim 4, further comprising:
determining whether information of the IP header including the IP 5-tuple, is encrypted or not;
mapping to a security mode, when it is determined that the IP header information is encrypted, a flow of a corresponding data packet among the one or more data packets with a corresponding dedicated bearer among data radio bearers (DRBs) using an RRC configuration, wherein the corresponding dedicated bearers indicate a different type of security mode that is enabled for the corresponding data packets; and
transmitting the one or more data packets with the mapped flow to the lower layer.

6. The method as claimed in claim 1, further comprising:
adding, into the PDCP header, information regarding each of the encrypted headers along with their encryption length;
adding the PDCP header after addition of the information regarding each of the encrypted headers to each of the one or more data packets; and
transmitting the one or more data packets with the PDCP header including additional security information, to the lower layer.

7. The method as claimed in claim 1, further comprising:
determining whether the application data of the one or more data packets including the security header is encrypted or non-encrypted based on parsing of the corresponding header information; and
perform an integrity protection process on at least one of the application data and the corresponding header information of the one or more data packets when it is determined that at least one of the application data of the one or more data packets is non-encrypted.

8. The method as claimed in claim 7,
wherein the integrity protection process includes addition of a message authentication code-integrity (MAC-I) field at a location that is present before application data field within a packet payload of each of the one or more data packets, and
wherein the method further comprising:
encrypting the added MAC-I field;
adding information regarding the location of the MAC-I field and encryption of the MAC-I field into the PDCP header of each of the one or more packets; and
transmitting, to the lower layer, the one or more data packets to which the information regarding the location of the MAC-I field and the encryption of the MAC-I field is added into the PDCP header.

9. The method as claimed in claim 8, wherein the location corresponds to a location on a specific portion of the header information within the payload of the one or more data packets.

10. The method as claimed in claim 8, further comprising masking a location of the MAC-I field with a unique mask if the MAC-I field is present at a location within the packet payload of the one or more packets.

11. A security processing method performed by a receiver in a communication network, the method comprising:
receiving one or more data packets from a transmitter through a lower layer, wherein each of the one or more data packets includes a packet data convergence protocol (PDCP) header and header information including a plurality of headers including an internet protocol (IP) header, wherein the PDCP header includes information related to an encrypted portion of the header information and an encryption length of the encrypted portion;
determining, based on a data radio bearer (DRB) configuration of each of the one or more data packets, a security mode that is enabled for a corresponding data packet of the one or more data packets;
determining whether selective encryption is enabled in the corresponding data packet of the one or more data packets based on the determined security mode and, parsing the information related to the encrypted portion of the header information and the encryption length of the encrypted portion from the PDCP header; and decrypting the IP header of data packets for which it is determined that the selective encryption is enabled, wherein the plurality of headers includes the IP header, a security header, a transport control protocol (TCP) header, and a service data adaption protocol (SDAP) header, and wherein the security header includes a transport layer security (TLS) header information.

12. The method as claimed in claim 11, wherein each of the one or more data packets includes a message authentication code- integrity (MAC-I) field, and wherein the PDCP header further includes a location of the MAC-I field with respect to a location of the header information.

13. The method as claimed in claim 12, further comprising:

generating a MAC-I for each of the one or more data packets based on the header information as a result of the decryption of the IP header;

comparing an integrity of the generated MAC-I with an integrity of the MAC-I field included in the one or more data packets; and determining a validity of the received one or more packets based on a result of the comparing that indicates a match between the integrity of the generated MAC-I and the integrity of the MAC-I field included in the one or more data packets.

14. The method as claimed in claim 11, wherein the DRB configuration includes a corresponding DRB ID for a corresponding data packet of the one or more data packets, and wherein the method further comprises determining, based on the corresponding DRB ID for the corresponding data packet of the one or more data packets, the security mode that is enabled for the corresponding data packet of the one or more data packets.

15. A transmission device in a wireless communication system, the transmission device comprising:

a transceiver; and one or more processors including processing circuitry; and memory storing instructions that, when executed by the one or more processors individually or collectively, cause the transmission device to:

control the transceiver to receive, at a packet data convergence protocol (PDCP) layer from an upper layer, one or more data packets, each of the one or more data packets including header information and application data, wherein the header information includes a plurality of headers;

parse the header information of the one or more data packets;

determine, based on the parsing of the header information, a length of each of the plurality of headers within the corresponding header information and whether a security header is present or absent in the one or more corresponding data packets;

identify, based on the determination, corresponding header information of the one or more data packets in which the security header is present;

identify, based on the parsing of the header information, whether internet protocol (IP) packets among the received one or more data packets are already classified as an encrypted flow;

encrypt, based on the determined header lengths, each of the plurality of headers of the identified corresponding header information in which the security header is present; and control the transceiver to transmit the one or more data packets to a lower layer after adding information regarding each of the encrypted headers along with their encryption length into a PDCP header, wherein the plurality of headers includes an internet protocol (IP) header, a security header, a transport control protocol (TCP) header, and a service data adaption protocol (SDAP) header, wherein the security header includes a transport layer security (TLS) header information, and wherein the instructions, when executed by the one or more processors individually or collectively, cause the transmission device to:

transmit, to the lower layer, the IP packets without applying encryption at the PDCP layer in case that the IP packets are already classified as the encrypted flow.

16. A reception device in a wireless communication system, the reception device comprising:

a transceiver; and one or more processors including processing circuitry; and memory storing instructions that, when executed by the one or more processors individually or collectively, cause the reception device to:

control the transceiver to receive one or more data packets from a transmission device through a lower layer, wherein each of the one or more data packets includes a packet data convergence protocol (PDCP) header and header information a plurality of headers including an internet protocol (IP) header, wherein the PDCP header includes information related to an encrypted portion of the header information and an encryption length of the encrypted portion;

determine, based on a data radio bearers (DRB) configuration of each of the one or more data packets, a security mode that is enabled for a corresponding data packet of the one or more data packets;

determine whether selective encryption is enabled in the corresponding data packet of the one or more data packets based on the determined security mode and parsing of the information related to the encrypted portion of the header information and the encryption length of the encrypted portion from the PDCP header; and decrypt the IP header of data packets for which it is determined that the selective encryption is enabled, wherein the plurality of headers includes the IP header, a security header, a transport control protocol (TCP) header, and a service data adaption protocol (SDAP) header, and wherein the security header includes a transport layer security (TLS) header information.

* * * * *